Oct. 7, 1969 J. F. IRWIN 3,470,980

HYDRAULIC MAN-POSITIONER

Filed Feb. 5, 1968 4 Sheets-Sheet 1

INVENTOR.
JERE F. IRWIN
By
ATTORNEY.

INVENTOR.
JERE F. IRWIN
BY [signature]
ATTORNEY.

10
11
12
13
14
15
22
25
26
27
29
30
31
32
35
48
65
70
85
89
90
91
92
93
100
105
106
107
109
115
116
117
118
120
122
123
124
125
130
131
132
134
136
140
145
146
149
150
151
153
178
181
182
183
184
190
191
4

13
28
29
31
32
33
34
35
40
41
42
43
44
45
46
47
48
49
55
56
161

HYDRAULIC MAN-POSITIONER

INVENTOR.
JERE F. IRWIN
By [signature]
ATTORNEY.

United States Patent Office 3,470,980

Patented Oct. 7, 1969

3,470,980

HYDRAULIC MAN-POSITIONER

Jere F. Irwin, P.O. Box 211, Yakima, Wash. 98901

Filed Feb. 5, 1968, Ser. No. 702,856
Int. Cl. B66f *11/04*
U.S. Cl. 182—2 9 Claims

ABSTRACT OF THE DISCLOSURE

A farm tractor accessory including a horizontal T-frame of 4" square tubing from the tips of which three short legs extend adjustably to the ground. A hydraulically manipulated three-dimensional man-positioner is centrally mounted on the frame, the tubing of which provides a reservoir for the hydraulic fluid. The frame is parallelogram-link supported from the tractor differential housing for powered elevation while travelling.

BACKGROUND OF THE INVENTION

Field of the invention

Many different varieties of man-positioners have been developed, each of which provides a cage in which a man is carried and from which he is able to control the three-dimensional positioning of said cage at various elevations and directions from the base of the device for facilitating his working on telephone and electric wire lines, on trees, both ornamental and horticultural, and for various other purposes.

Description of the prior art

Man-positioners for use in horticulture, and designed as an accessory for a farm tractor, have taken numerous forms. It is an improvement in this particular category of the man-positioner art that the present invention was developed.

SUMMARY OF THE INVENTION

The present invention provides an accessory for a farm tractor which may be readily attached to or disconnected from the latter, which avails itself of the power takeoff devices which are conventionally provided on such a tractor, which normally rests on three legs just to the rear of the tractor so as to be firmly supported on the ground during operation; which is parallelogram-link mounted on the differential housing of the tractor and connected with the power takeoff of the latter giving the driver the option of lowering the man-positioner onto the ground in order to utilize the same as when working on an adjacent tree, or on the other hand, to power lift the man-positioner from the ground and, with this supported by the tractor, shift the man-positioner to a new ground-supported position.

The present invention also provides a novel and economical reservoir for the hydraulic fluid used in actuating the man-positioner by forming the main frame of the man-positioner in the shape of a horizontal T made of 4" square tubing, the internal voids of a portion of which are employed as a hydraulic fluid reservoir.

Another object of the present invention is to provide a man-positioner mounted for power rotation on a vertical axis and including a pair of parallelogram-links formed of hollow tubing, a pair of hydraulic cylinders for actuating said links, and another hydraulic cylinder for rotating the entire man-positioner, these cylinders being part of a hydraulic system including a set of control valves and operating pedals in the man-carrying cage from which the entire system may be controlled and with which the cage is connected by hydraulic hoses for which the hollow tubes forming said parallelogram-links provide conduits to protect the same from damage.

DESCRIPTION OF THE PREFERRED EMBODIMENT

Figure 1:
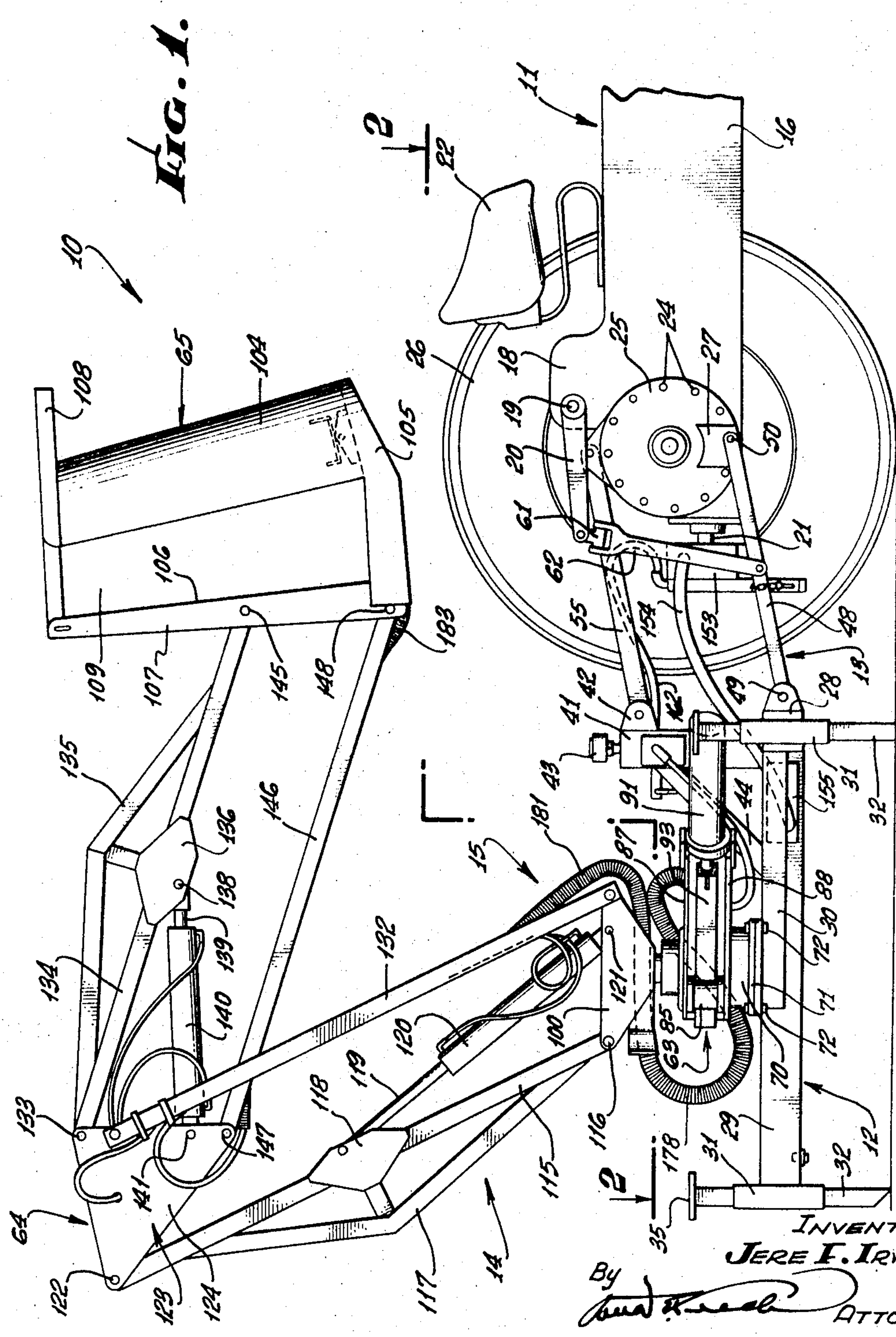
FIGURE 1 is a side elevation of a preferred embodiment of the invention showing the same mounted on a farm tractor and with the invention resting on the ground in readiness for operation by a man standing in the man-positioning cage.

The invention, which may be indicated in its entirety by the numeral 10, preferably embraces a conventional farm tractor 11, a tripod supported frame 12, a parallelogram system of linkage 13 by which the frame 12 is linked to the tractor 11, a man-positioner 14 (using this term specifically) which is pivotally mounted on a vertical axis on frame 12, and a hydraulic power system 15 deriving power from said tractor and controlled by a man carried by said man-positioner for manipulating the latter.

The farm tractor 11 may be selected from any of the conventional farm tractors available on the American market and includes a heavy metal body 16, the front end portion of which is not shown in the drawings, but which terminates at the rear end in a different housing 17 and a power takeoff boss 18 from which opposite ends of a power takeoff shaft 19 extend laterally, these shaft ends having arms 20 fixed thereto and extending rearwardly therefrom. The differential housing 17 also provides a longitudinal power takeoff shaft 21 which extends rearwardly therefrom. A seat 22 is mounted on the body 16 for accommodating the driver of the tractor. Bolted to opposite sides of the differential housing 17 by bolts 24 are rear axle housings 25 on which are rotatably mounted the rear drive wheels 26 of the tractor. The housing 25 have, on the lower surfaces thereof, link pivoting bosses 27.

The tripod support frame 12 comprises basically a T formed of two steel tubes 28 and 29, a cross section of which is approximately 4" square. The tube 28 is disposed transversely of the invention just to the rear of the tractor drive wheels 26 while the tube 29 is disposed longitudinally and centrally relative to tube 28 with its front end abutting against said tube and welded thereto at the middle of tube 28 to form a right angle therewith. Tubes 28 and 29 are reinforced by diagonal tubes 30, a cross section of which is approximately 2½" square. Opposite ends of tubes 30 are mitered and welded to tubes 28 and 29 flush with upper faces of the latter.

The outer extremities of tubes 28 and 29 are closed by square steel plates welded therein. Also welded to the outer extremities of said tubes are square tubular leg sockets 31 which are open at both ends. Vertically slideably mounted in the tubular sockets 31 are square tubular legs 32 which are adjustably held in selected vertical positions in the sockets 31 by pins 33. One end of each of the legs 32 is preferably chisel pointed as shown at 33 but the other end of said leg is provided with a flat square sheet metal plate 34 welded thereto. The legs 32 are adapted to be selectively inserted into the sockets 31 with either the pointed ends 33 thereof or the head plates 34 disposed downwardly, depending upon the terrain on which the invention is working.

Secured as by welding to the front edge of tube 28 are lugs 40. Welded to the upper surfaces of the tubes 28 and 29 so as to overlap the plane in which said tubes are joined and extending vertically upward therefrom in a short section of steel tubing, 4" square in cross section, which constitutes a tower 41 for the tripod frame 12 and has a pair of lugs 42 welded to the front face thereof at its upper end for a purpose to be made clear hereinafter. The upper end of tower 41 is closed by welding a square steel plate thereto and a tapped hole is centrally provided therein for receiving the threaded nipple of a conventional air breather 43. A brace 44 formed of steel tubing with 2½" square cross section and mitered at its ends is welded to the tower 41 and main frame tube 29 within the angle formed between these two elements. Communication is provided between the interior of tower 41 and main frame tube 29 by a hole 45 formed in the adjacent end of tube 29 within the area covered by tower 41.

Welded to the upper surface of tube 39 at a central location within the tripod support frame 12 is a man-positioner supporting plate 46 which also overlaps and is welded to diagonal brace tubes 30. The lower wall of the tube 29 near its rear extremity is provided with a suitable tapped hole for receiving a drain plug 47.

The linkage system 13 which connects the frame 12 with the tractor 11 includes a pair of links 48, the front ends of which extend outside of and are pivotally connected by bolts 49 with lugs 40, and the front ends of which overlap and are pivotally mounted by bolts 50 on bosses 27 on the rear axle housings 25. This link system also includes an upper link 55 which is triangular in shape with its narrow end extending between and pivotally connected to the lugs 42 by a pin 56, while its rear end is bifurcated to provide axially aligned but laterally spaced bearings 57. These bearings are pivotally connected by a heavy pin 58 which extends therethrough and through a central lug 59 and lateral lugs 60 provided on differential housing 17 of the tractor 11.

Figure 2:
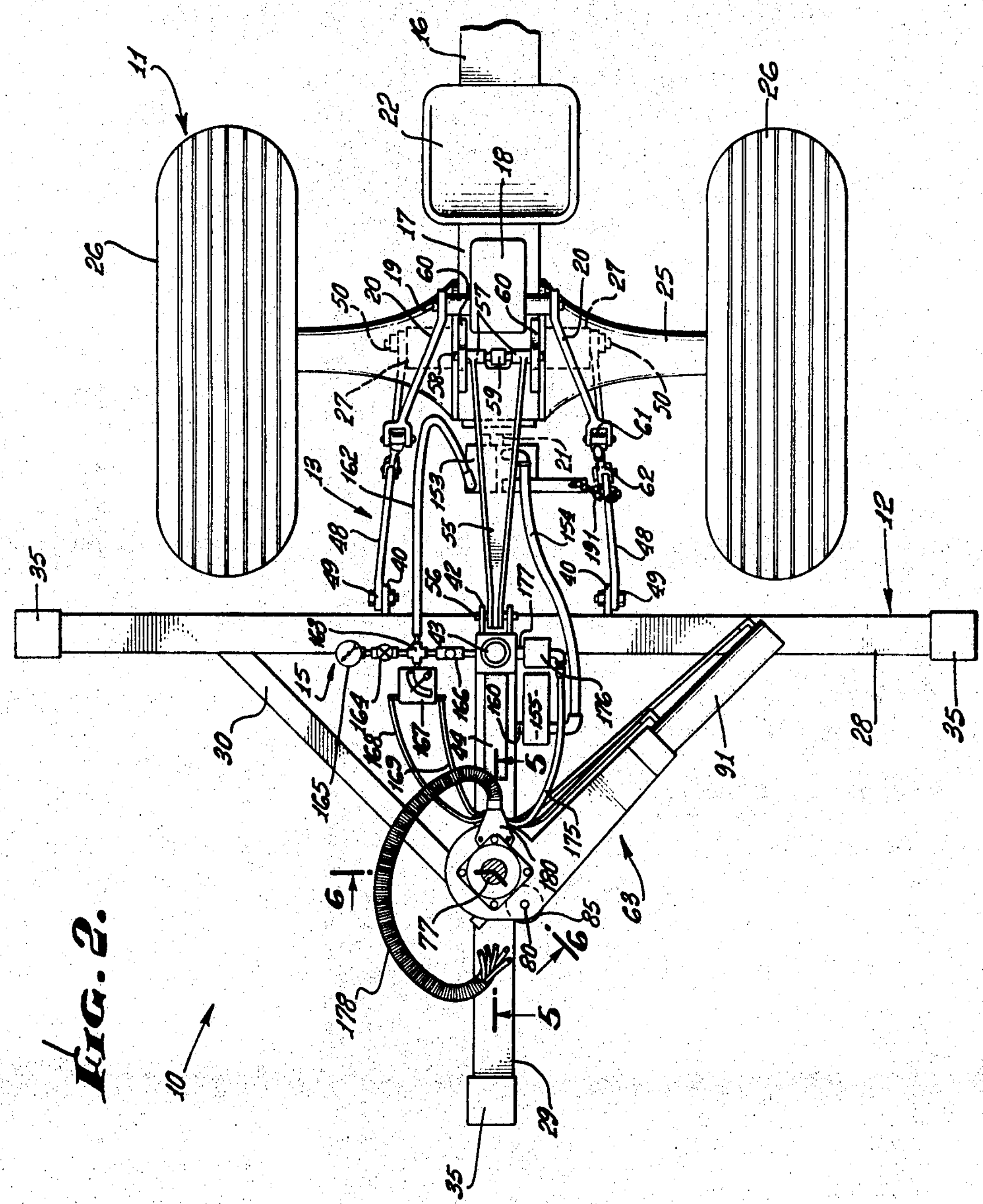
FIGURE 2 is a horizontal sectional view taken on the line 2—2 of FIGURE 1.
Figure 3:
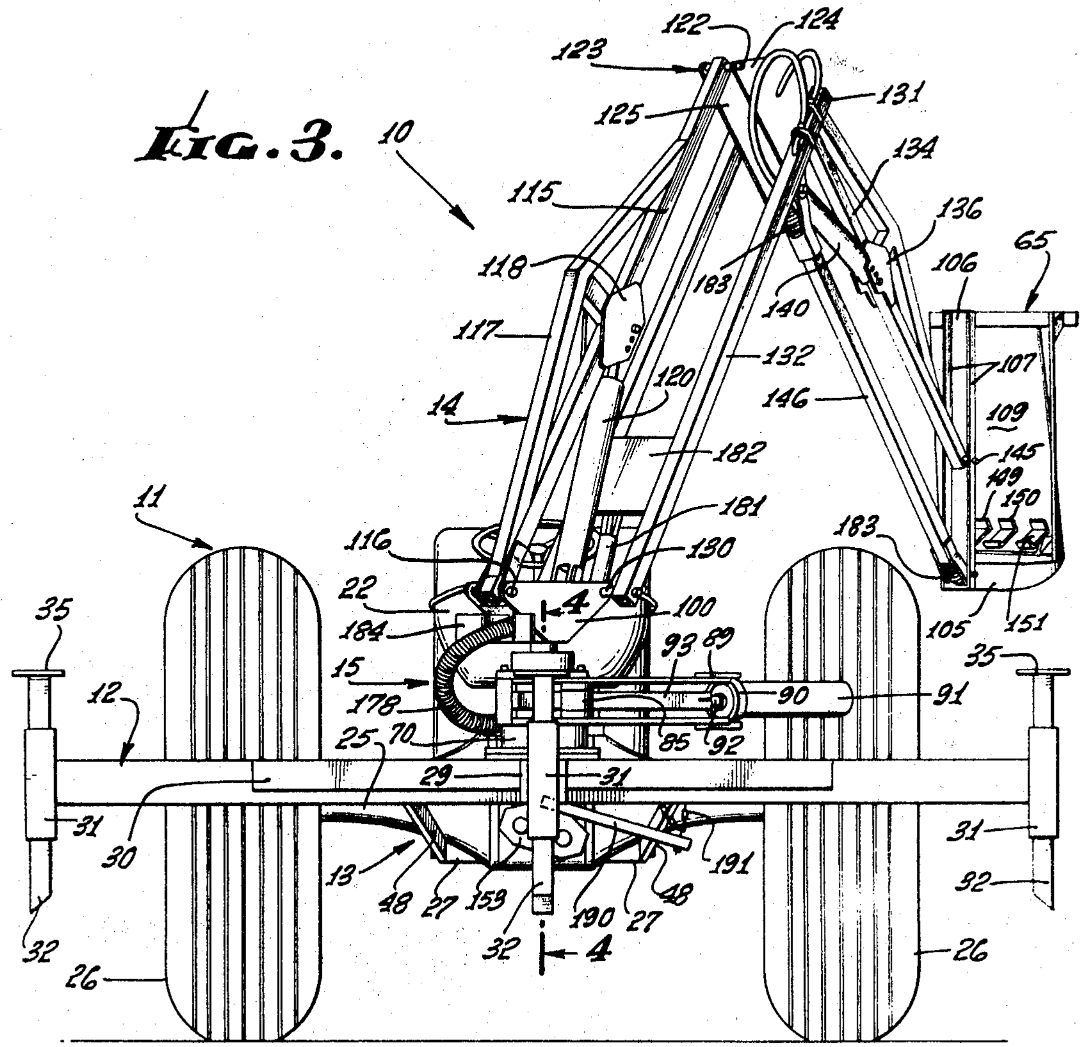
FIGURE 3 is a rear elevational view of FIGURE 1 with the man-positioner of the invention elevated by actuation of a certain power take-off provided on said farm tractor and with the man-positioner actuated to place the man-carrying cage thereof forwardly therefrom and slightly to the right of said tractor so as to render visible in this view the three control pedals in said cage by which the invention is controlled by the man in the cage.
Figure 4:
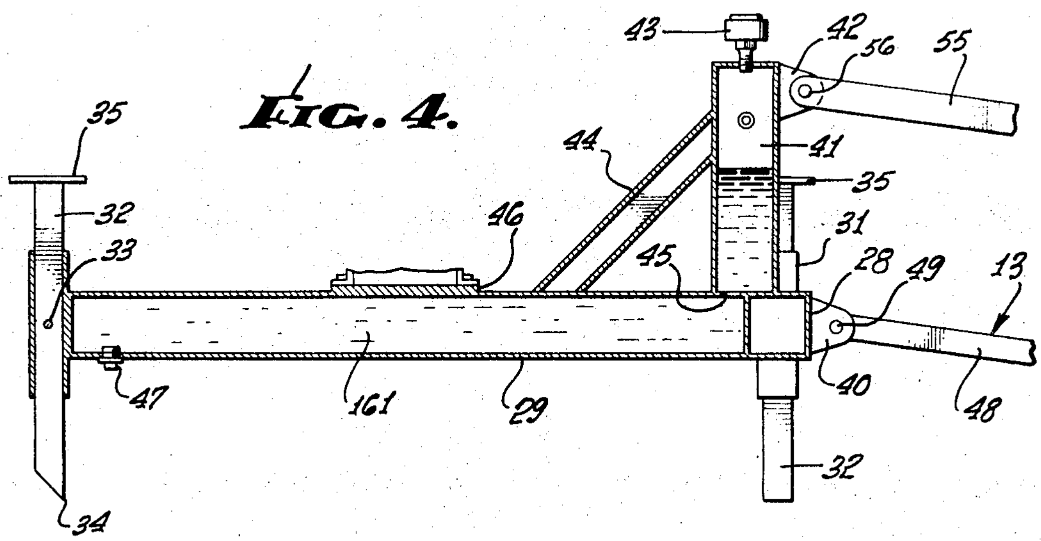
FIGURE 4 is an enlarged detailed sectional view taken on the line 4—4 of FIGURE 3 and illustrating the use made in the invention of a portion of the space available within the frame tubing to provide a reservoir for the hydraulic fluid required in operating the invention.

The rear extremities of power takeoff arms 20 provided on the boss 18 of the farm tractor 11 are bifurcated and form parts of universal joints 61 connecting said arms with the upper ends of a pair of links 62, the lower ends of which are bifurcated and pivotally connected to links 48 approximately at midpoints in the latter. Suitable conventional means (not shown) are provided on the tractor for actuation by the driver of the tractor from the seat 22, for optionally applying power from the motor of the tractor to the power takeoff arms 20 so as to swing these upwardly and thus operate (through the linkage system 13) to lift the tripod support frame from its position of rest on the ground in which it is shown in FIGURES 1 and 2 to an elevated position in which it is supported on the tractor as shown in FIGURES 3 and 4. It is thus within the option of the tractor driver to lift or lower the frame 12 at his convenience.

The man-positioner mechanism 14 includes a base assembly 63, an arm assembly 64, and a cage 65. The base assembly includes a base shell 70 which includes a securing plate 71 which is secured by bolts 72 to the frame base plate 46. The shell 70 includes upper and lower horizontal plates 73 and 74 which are coaxially apertured and have mounted thereon upper and lower ball bearings 75 and 76 in which a man-positioner mount shaft 77 journals. Fixed to shaft 77 by a pin 78 between upper and lower plates 73 and 74 is a rack pinion 79. Pivotally mounted on a pin 80, secured at its upper and lower ends to the plates 73 and 74, is a rack guide roller 85 having a flat annular groove 86 formed in the periphery thereof. The plates 73 and 74 have extensions 87 and 88 which are connected by bolts 89 to the head 90 of a hydraulic cylinder 91, the piston rod 92 of which connects with one end of a rack 93 which extends between the rack pinion 79 and the rack guide roller 85 so as to fit into the groove 86 formed in the latter and mesh with said pinion. A positioner mounting head 100 is provided on the upper end of shaft 77, this head including triangular vertical side plates 101 and upper and lower horizontal plates 102 and 103 which are coaxially apertured to slip over the upper end of shaft 77 and are welded to said shaft and to side plates 101.

The arm assembly 64 of the man-positioner mechanism 14 articulately connects the mounting head 100 with the cage 65. This cage comprises a sheet metal body 104 having a floor 105, said body including a back wall 106 having a pair of closely spaced vertical flanges 107. The upper end of the body 104 is provided with a rail 108, there being a chain controlled door opening 109 formed in said body and said rail through which the operator may enter and leave said cage.

Returning now to the arm assembly 64, this comprises a main support arm 115 which is formed of hollow tubing of square cross section, the lower end of this arm being pivotally supported on a pin 116 between the side plates 101 at one end of mounting head 100. This arm is provided with tubular bracing 117 and a pair of culcrum bearing plates 118 between which is pivotally mounted the upper end of the piston rod 119 of a hydraulic cylinder 120, the lower end of which is pivoted on pin 121 between the side plates 101 of mounting head 100. The upper end of arm 115 is pivotally connected by a pin 122 with one corner of a triangular connecting element 123 which includes spaced plates 124 and 125. Pivotally connected at their lower ends by support pins 130 to opposite corners of side plates 101 disposed oppositely from the pin 116, and, at their upper ends, by support pins 131 to aligned points on the connector element 123 at a distance from the pin 122 are tubular support arms 132. These arms are parallel with arm 115.

Pivotally connected by pin 133 to the triangular connector element 123 at the upper corner of the latter is a second main support arm 134. This arm is provided with tubular bracing 135 and has fulcrum bearing plates 136 which provide a connection therewith through pin 138 with the extremity of a piston rod 139 of a hydraulic cylinder 140, the opposite end of which cylinder is pivotally connected by pin 141 with said triangular connector element 123. The opposite end of main support arm 134 is pivotally connected by a pin 145 with the vertical flanges 107 of the cage 65, a substantial distance above the cage floor 105.

An upper tubular support arm 146 is also provided in the arm assembly, one end of which arm pivotally connects through a pin 147 with the lower corner of the triangular element 123 while the opposite end of said arm connects through a pin 148 with lower ends of vertical flanges 107 of the cage 65. Arm 146 is parallel with arm 134.

Figure 7:
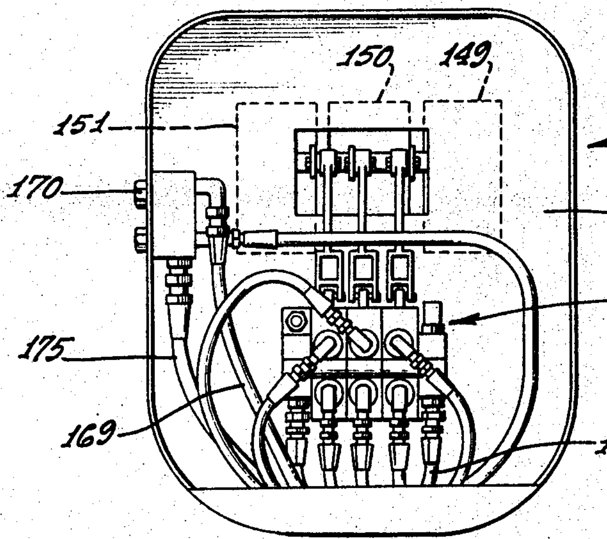
FIGURE 7 is a bottom plan view of the man-carrying cage of the invention with the bottom cover removed to illustrate the control valve means utilized by a man carried in said cage for exercising complete control of the invention for placing said cage in any of a multiude of different positions located within the range of the mechanism of the invention.

The cage 65 also includes three foot pedals 149, 150 and 151 which are pivotally mounted on the floor 105 as indicated in FIGURES 1 and 3 so that a foot of the operator may be placed on any one of these to secure two control actions with each pedal, one by rocking the pedal forwardly and the other by reversely rocking the pedal. The rocking of pedal 149 controls the admission of hydraulic fluid to one end or the other of hydraulic cylinder 91 which controls the rotation of the man-positioner. Rocking foot pedal 150 controls the admission of hydraulic fluid to either end of hydraulic cylinder 120 while the rocking of foot pedal 151 controls the admission of hydraulic fluid to either end of hydraulic cylinder 140. The control thus exercised by these foot pedals is accomplished through connections between said foot pedals and a hydraulic valve complex 152 mounted on the bottom of the floor 105 as shown in FIGURE 7. The construction of this valve being conventional, it is deemed unnecessary to encumber this disclosure with the details of its structure. Suffice it to say that this complex includes three, three way valves, each of which is actuated by one of said foot pedals. These valves are connected by suitable hydraulic hoses to the opposite ends of the aforesaid hydraulic cylinders and to a pressure line delivering hydraulic fluid under high pressure to said valve complex and to a reservoir return line which returns oil from said complex to the hydraulic reservoir illustrated in FIGURE 4.

As shown in FIGURE 2, the hydraulic power system 15 includes a hydraulic pump 153 which is mounted on and actuated by the longitudinal power takeoff shaft 21 of the farm tractor 11. The intake of said pump is connected by an intake hose 154 with a filter 155 which in turn is conconnected by a short pipe 160 with the reservoir 161 provided by frame tubes 29 and 41. The discharge end of pump 153 is connected by a high pressure hose 162 to a 4-way fitting 163 which connects through a valve 164 with a pressure gage 165 and also connects through a pressure relief valve 166 with the tower 41 of the reservoir 161. Fitting 163 also connects with a pressure divider 166 which divides the flow of liquid under pressure entering the same between two high pressure hoses 168 and 169, one of which hoses leads to the hydraulic valve complex 152 to provide the valves thereof with hydraulic fluid under high pressure and the other of which leads to an outlet 170 provided at one side of the cage floor 105 for supplying hydraulic fluid if necessary to hydraulically operated pruning equipment and other power tools utilized by a man operating the invention.

Figure 5:
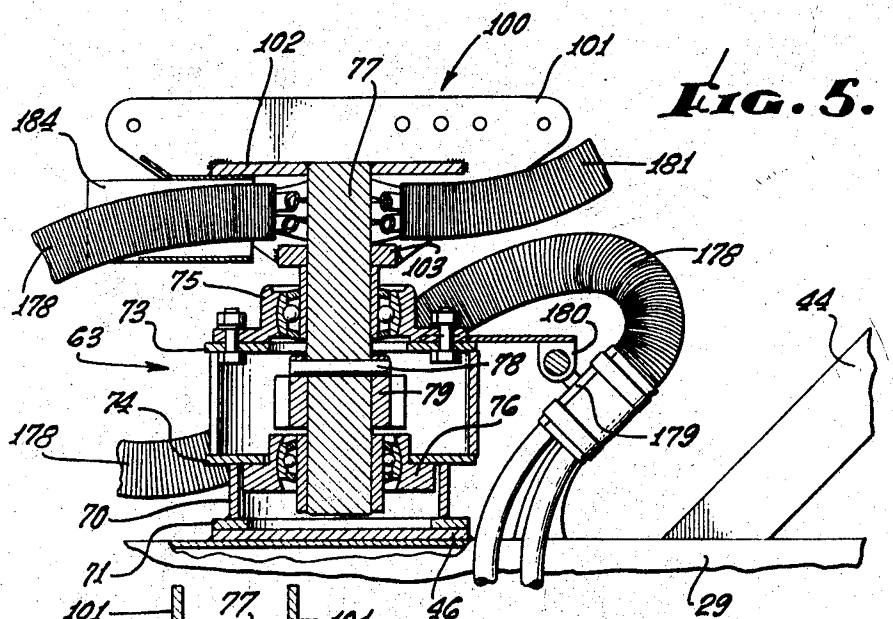
FIGURE 5 is an enlarged fragmentary detailed vertical sectional view taken on the line 5—5 of FIGURE 2 and illustrating the vertical pivotal mounting of the man-positioner of the invention on its supporting frame.
Figure 6:
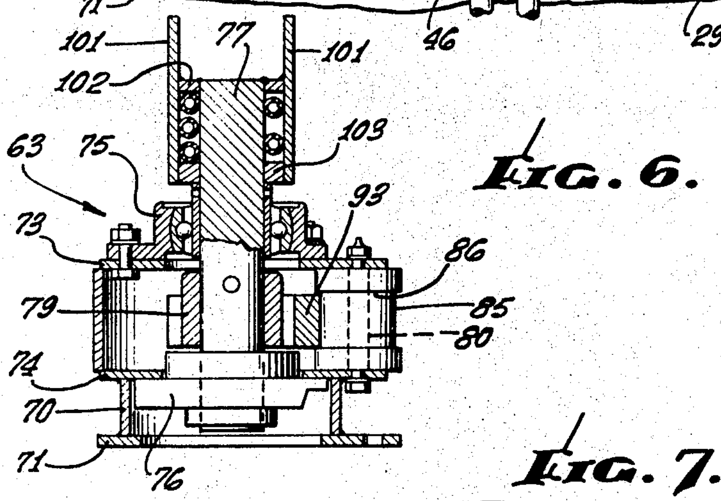
FIGURE 6 is a vertical sectional view taken on the line 6—6 of FIGURE 5 and illustrating the hydraulic mechanism for rotating the man-positioner about the axis of said mounting.

Reservoir return line 175 leads from valve complex 152 in the cage 65 through a filter 176 through which return fluid passes to be filtered and from which it is delivered through a short connecting pipe 177 into the tower 41 of the hydraulic fluid reservoir 161. As shown in FIGURES 1, 2, 5, 6 and 7, the hydraulic hoses employed in the hydraulic power system 15 of the invention which originate on the level of the tripod support frame 12 are brought together at the base level and are threaded into and extend through a coiled wire conduit 178 which confines and protects these hoses during the swing of the man-positioner 14 about the vertical axis of the shaft 77 in the operation of the device. The conduit 178 is separated where these hoses pass around the shaft 77 as shown in FIGURES 5 and 6.

The hoses entering the lower end of coiled wire conduit 178 are held together by a clamp 179 which is pivotally mounted on a bracket 180 fixed to upper plate 73 of base shell 70. The conduit 178 is of sufficient length to conduct the hoses confined herein to the opposite side of the positioner mounting head 100, as shown in FIGURES 1, 2, 3 and 5, where the hoses are threaded horizontally through the spaces in said head on opposite sides of the shaft 77. These hoses are then threaded through a second coiled wire conduit 181 which conducts the same upwardly to a plate 182 which unites lower portions of tubular support arms 132 in order to give these rigidity. The hoses at this point are threaded into suitable apertures provided in arms 132 and are conducted thereby to the upper ends thereof where said hoses pass from arms 132 into the adjacent end of a third coiled wire conduit 183 which is confined within the tubular support arm 146 and through which said hoses are conducted to the hydraulic valve complex 152 on the cage 65.

It is to be noted that the conduit 178 is guided into the mounting head 100 by a sheet metal guide 184 which prevents undue wear of said conduit. The conduit 178 is of sufficient length to permit the head 100 to freely rotate through an angle of 360° without applying any undue strain either upon the conduit 178 or the hoses confined therein.

To offset the torque to which the hydraulic pump 153 is subjected by the power takeoff shaft 21, this pump is provided with an arm 190 which is connected by a chain 191 to one of the links 48 which absorbs this torque. This connection of the arm 190 with a link 48 also has the advantage, when the man-positioner, is lifted by the driver of the tractor in order to shift the same to a new position, of swinging the arm 190 upwardly clear of obstacles over which the tractor may pass.

I claim:

1. In a hydraulic man-positioner provided as an accessory for a farm tractor equipped with conventional power takeoff facilities, the combination of:
   a wide low flat frame supported on the ground by relatively short legs;
   a cage positioner base;
   means for rotatably mounting said base approximately centrally on said frame on a vertical axis;
   a man carrying cage;
   a cage positioning mechanism mounted on said base and connected to said cage;
   hydraulic power means including a pump means driven by a power takeoff on said tractor, fluid reservoir means, pedal controlled valve means on said cage, hydraulic cylinder means for applying power to rotate said positioner base and to actuate said cage positioning mechanism in response to actuation of said valve means, and hydraulic hoses operatively connecting the aforesaid means; and
   parallelogram-link means linking said frame to said tractor and to a power takeoff on said tractor whereby the driver of said tractor, at his option, may lift said frame and man-positioner from the ground, carrying it suspended on said tractor to a new operating position and lower it back onto the ground.

2. A combination as recited in claim 1 wherein:
   said frame comprises two relatively heavy frame members united in the form of a capital T with the head of the T transversely disposed just back of said tractor and extending laterally beyond the sides of the tractor and with the stem of the T disposed in central alignment with said tractor and extending backwardly therefrom, and a short tower frame member united with said heavy frame members at their point of juncture and extending upwardly therefrom; and wherein
   said feet are three in number and located at the free ends of said frame T; and wherein
   said parallelogram-link means comprise parallel upper and lower links including two lower links linking said T head frame member to said tractor and one upper link linking the top of said tower member to said tractor.

3. A combination as recited in claim 2 wherein
   said heavy frame members and said tower frame member comprise steel tubes in the order of four inches square in cross section,
   certain of said frame members providing a reservoir for liquid as required by said hydraulic power means.

4. A combination as recited in claim 3 wherein
   tubular steel braces are welded to opposite sides of the T stem heavy frame member in angled relation thereto and their opposite ends welded to said T head heavy frame member; and wherein a tubular steel brace is welded at its opposite ends to said T stem heavy frame member and to said tower frame member in angled relation therewith.

5. A combination as recited in claim 4 wherein said hydraulic reservoir is formed by liquid tight spaces confined within said T stem frame member and said tower frame member, said spaces being connected at the juncture between said members.

6. A combination as recited in claim 1 wherein said cage positioning mechanism comprises a main linkage parallelogram mounted on said base and a secondary linkage parallelogram mounted on the upper end of said main linkage parallelogram, the free end of the secondary parallelogram comprising said cage.

7. A combination as recited in claim 6 wherein the main articulating links of said main and secondary linkage parallelograms comprise parallel hollow tubes, said tubes serving also as conduits for said hydraulic hoses.

8. A combination as recited in claim 7 wherein the lower end portions of said hoses having terminal connections at the level of said frame are collected together and threaded into a flexible spring wire conduit;

means for fixing said hoses, where they enter the lower end of said wire conduit, to said frame at a point located close to one side of said base, the opposite end portion of said wire conduit conducting said hoses to the opposite side of said base where said hoses are threaded through said base from which point they extend upwardly through said linkage tubes of said cage positioning mechanism to said cage.

9. A combination as recited in claim 8 wherein said wire conduit is of sufficient length to permit free rotation of said base through an angle of approximately 360° without damage to said hoses.

References Cited

UNITED STATES PATENTS

| | | |
|---|---|---|
| 1,561,694 | 11/1925 | Clutter. |
| 2,391,224 | 12/1945 | Carter. |
| 2,672,377 | 3/1954 | Werner. |
| 3,163,880 | 1/1965 | Johnson. |
| 3,291,253 | 12/1966 | Wible. |
| 3,415,339 | 12/1968 | Range. |

REINALDO P. MACHADO, Primary Examiner